United States Patent [19]

Ango

[11] 4,166,595

[45] Sep. 4, 1979

[54] VARIABLE LIFT ADVANCING WING AIRCRAFT

[76] Inventor: Alvino J. Ango, 1252 Elliott St., Madison Heights, Mich. 48071

[21] Appl. No.: 891,699

[22] Filed: Mar. 30, 1978

[51] Int. Cl.² ............................................. B64C 39/00
[52] U.S. Cl. ....................................... 244/20; 244/9; 244/19; 244/70; 244/219
[58] Field of Search .................... 244/19, 20, 70, 4 R, 244/9, 27, 219; 416/7, 8

[56] References Cited

U.S. PATENT DOCUMENTS

1,839,556  1/1932  Henry .................................. 244/70

FOREIGN PATENT DOCUMENTS

514715  3/1921  France ..................................... 244/19

*Primary Examiner*—Barry L. Kelmachter
*Attorney, Agent, or Firm*—Edwin W. Uren

[57] ABSTRACT

An aircraft comprised of a pair of spaced apart interconnected air-frame members and a cargo compartment supported therewithin is provided with a plurality of expansible airfoils mounted for peripheral movement around the air-frame members as driven by a motor and associated drive, movement of the airfoils along the frontmost perimeters of the air-frame members providing the aircraft with forward thrust, and movement thereof along the uppermost perimeters of the air-frame members accentuating the lift provided by the airfoils. Structure associated with the motor and drive and with the mounting of the airfoils for peripheral movement around the air-frame members serves to controllably and elevationally alter the plano-convex profiles of the airfoils as they are driven along the uppermost and frontmost perimeters and to thus vary the lift and forward thrust provided respectively thereby, optimum elevational expansion of the airfoils as they are driven along the uppermost perimeters of the air-frame members serving to maximize the lift of the aircraft, and optimum elevational expansion thereof as they are driven along the frontmost perimeters serving to maximize the forward thrust of the aircraft.

20 Claims, 10 Drawing Figures

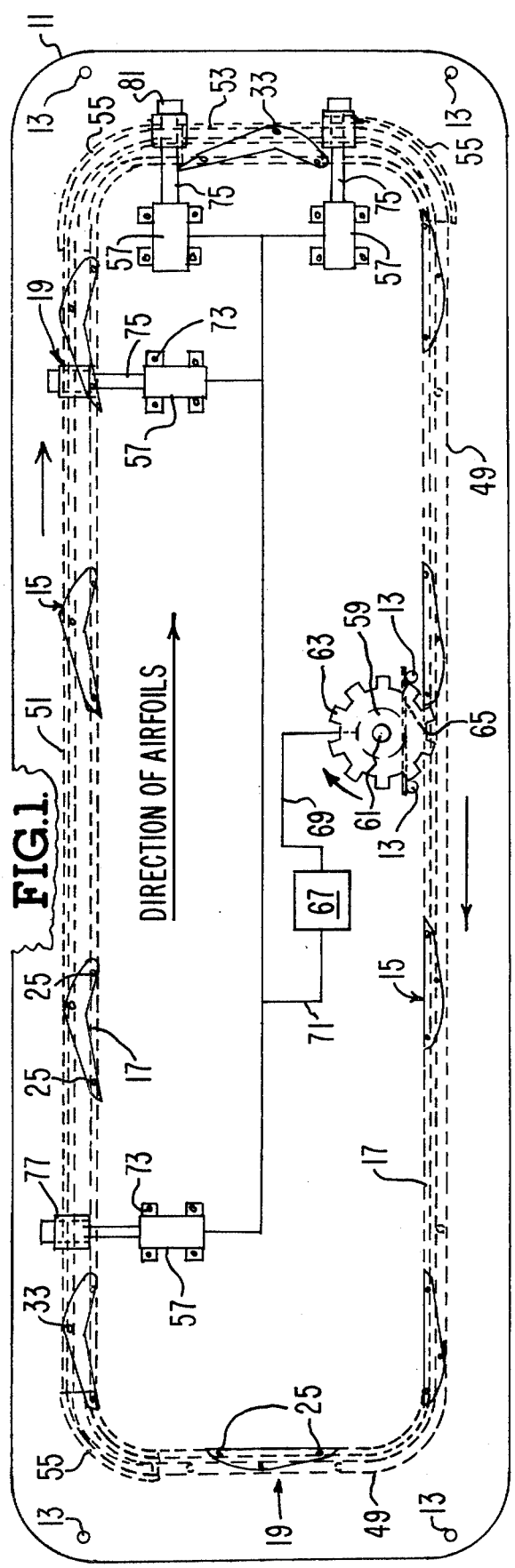
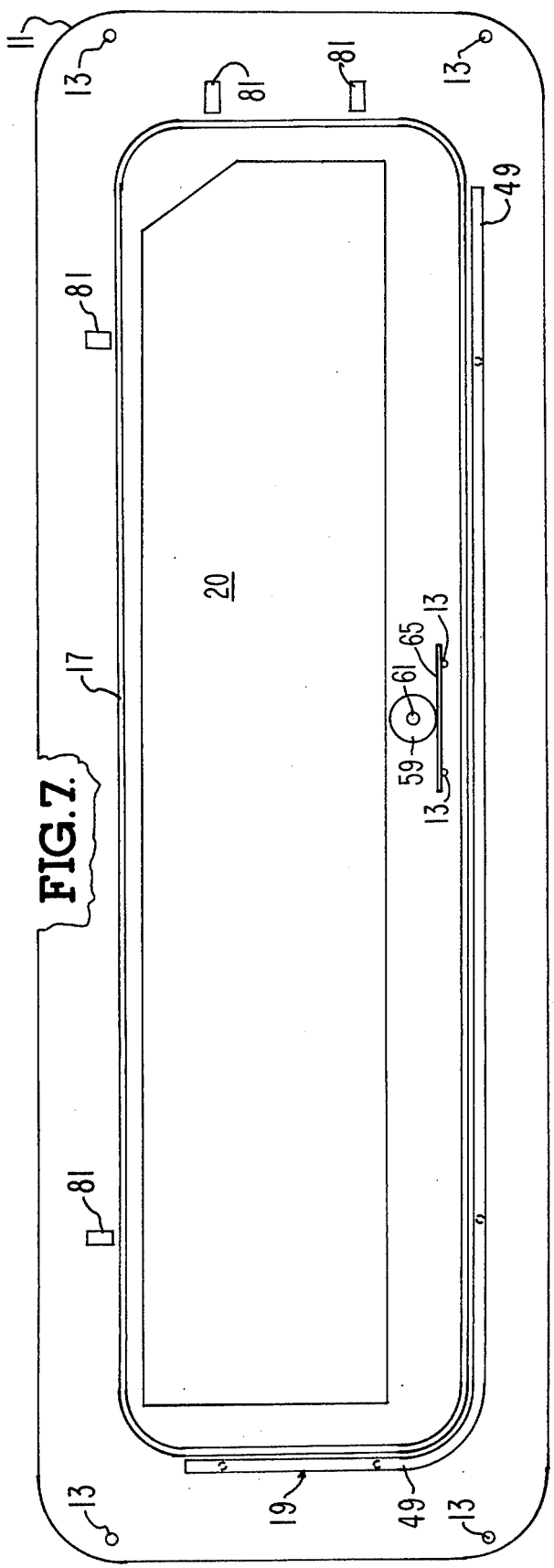

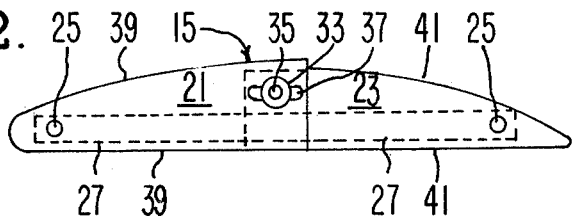
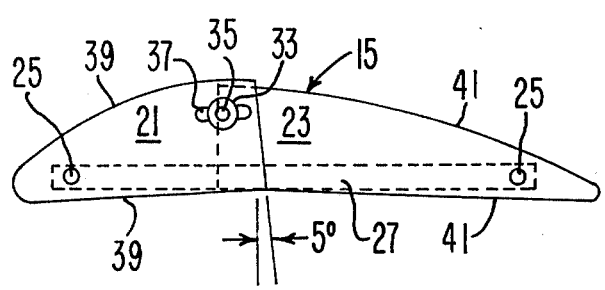
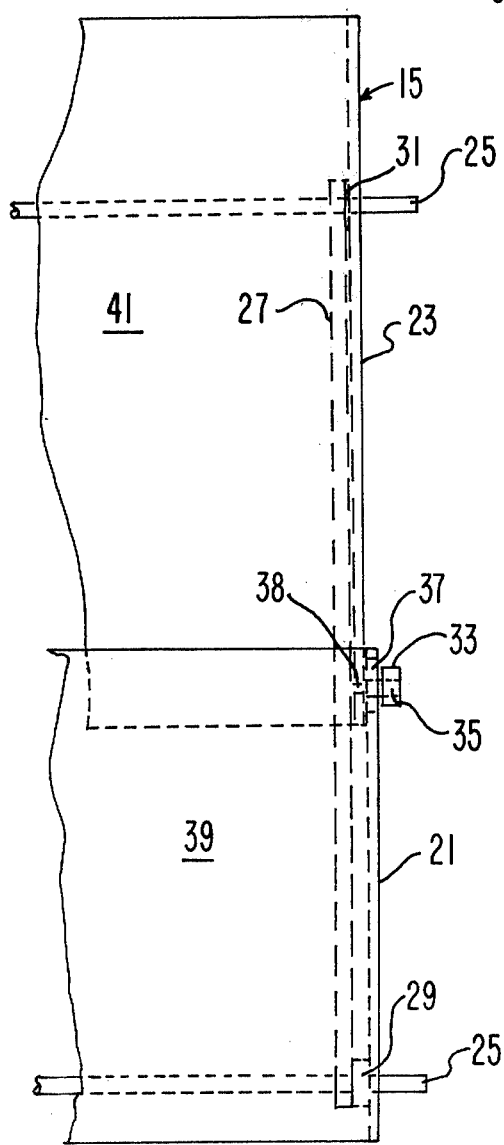
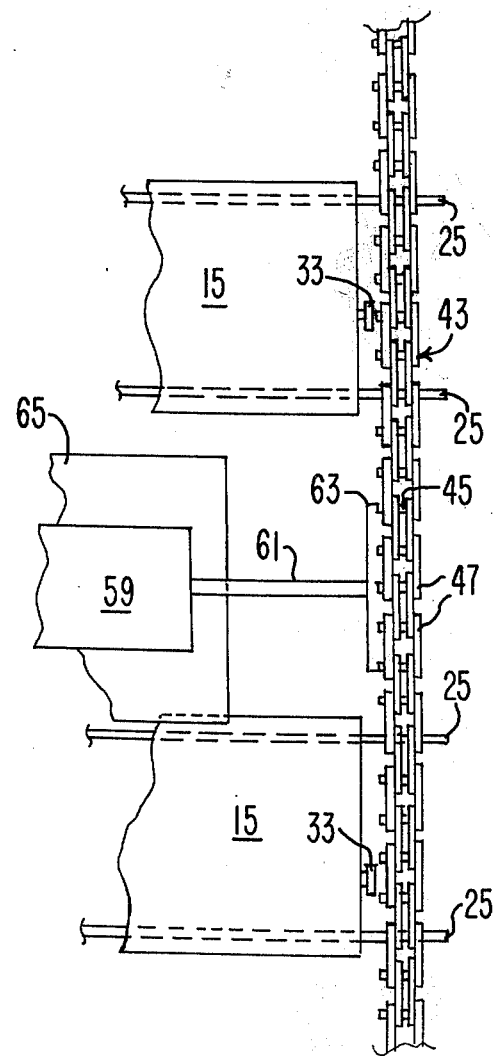

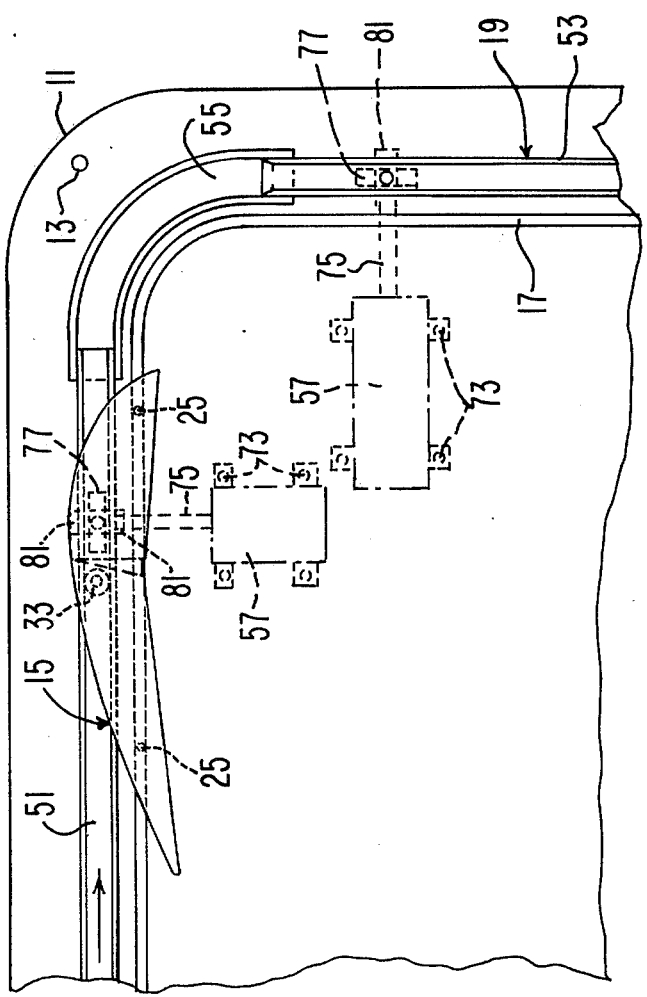

VARIABLE LIFT ADVANCING WING AIRCRAFT

BACKGROUND OF THE INVENTION

The history of the aircraft industry has been marked with innovations that have contributed in varying measure to the development of the present day aircraft, with each innovation recognizing or anticipating a changing need as ground transport gradually gave way to air transport. Early innovations in this development were directed to the range, speed and cargo capacity of the aircraft, with later innovations aimed at improved maneuverability and lift as aircraft size and weight increased and as urban areas mushroomed to lessen the adequacy of the city-based airport.

With the obsolescence of the city-based airport, new airports of more adequate acreage were established in areas remote from the cities, at distances ranging from 10 to 50 miles and frequently necessitating more land-travel time than flight time. Although aircraft accessibility was improved with the advent of air-shuttle and land-limousine services, the latter have provided but slight reduction in land-travel time, and air-shuttle service has remained out of the financial reach of the general public. With the advent of todays giant sized aircraft, even the remote-area airports have required expansion, with runways being lengthened to satisfy their take-off and landing requirements.

In recognition of the lift limitations of the fixed wing aircraft and the cargo limitations of the helicopter, further innovation is required if present airport patterns are to be altered, with remote-area airports ever expanding to accommodate commercial aircraft, and with city airports remaining the exclusive property of private aircraft and helicopters.

Attention then might well be directed to variable lift, cargo carrying aircraft that have the capability of taking off and landing on either the shorter runways of the city airport or the longer runways of remote-area airports, thereby preserving the utility of existing airports while at the same time bringing the ultimate destination of the traveler within more accessible and convenient reach, with land-travel time reduced to its former more proportionate ratio. Further attention might well be directed to an advancing-wing variable lift aircraft that has the lift advantages of the helicopter and the cargo capability of the commercial aircraft.

Notwithstanding the recognized high land-travel time ratio referred to above, and the emphasis in cargo capacity that has dominated the development of the modern fixed-wing aircraft, the disadvantages of the fixed wing and of the helicopter have long been known. Whereas the fixed-wing aircraft relies on forward propulsion or thrust for lift, the helicopter relies on the rotation of its rotary wings or airfoils. Although the lift limitations of the fixed-wing aircraft have been overcome in part by the development of high powered propulsion engines, these power plants, in combination with increased cargo capacity, have mangified rather than solved the airport dilemma, and have rendered the ultimate destination of the traveler all the more inaccessible. On the other hand, the characteristic lift limitations of the rotary wing aircraft, with their variation in air speed from wing tip to rotor, render them inappropriate for cargo carrying purposes.

SUMMARY OF THE INVENTION

It is accordingly an object of the present invention to provide an aircraft having the cargo capacity of the modern commercial aircraft and a lift comparable to the helicopter, such that existing city-based and remote-area airports may be utilized for landings and take-offs, and the traveler may embark and disembark in closer proximity to his home and destination.

It is another object of the present invention to provide an aircraft wherein the power plant is directly utilized for providing lift as well as forward thrust, and wherein the lift as well as the forward thrust is variable.

It is still another object of the present invention to provide an aircraft having a plurality of airfoils that are advancingly movable peripherally around its longitudinal perimeters, and wherein the air speed of each advancing airfoil remains constant along its latitudinal expanse.

It is yet another object of the present invention to provide an aircraft wherein the plano-convex profiles of its plurality of airfoils may be controllably and elevationally altered during the course of their peripheral advancement, such as to vary the lift and forward thrust of the aircraft, the lift of each airfoil being variable as it is driven along the uppermost perimeter of the aircraft and the forward thrust thereof being variable as it is driven along the aircraft's frontmost perimeter.

An important aspect of the present invention is the provision in an aircraft of a plurality of spaced apart movable airfoils mounted for peripheral movement around and between a pair of spaced apart and interconnected air frame members that serve to support a cargo compartment or the like, such airfoils being advancingly driven by motor means peripherally around the longitudinal perimeters of the air frame members, advancement of the airfoils along the frontmost perimeters thereof providing forward thrust to said aircraft, and advancement thereof along the uppermost perimeters of the air frame members serving to accentuate the lift provided thereby.

Another important aspect of the present invention is the provision in the multi-airfoil aircraft of means for expansibly and retractably changing the plano-convex profiles of each of the airfoils as they are advancingly driven along the uppermost and frontmost perimeters of the pair of interconnected air frame members, whereby the lift and forward thrust provided respectively by said airfoils is varied according to their plano-convex profiles, optimum elevational expansion of said airfoils as they are driven along the uppermost perimeters of the air frame members serving to maximize the lift provided thereby, and optimum elevational expansion of the airfoils as they are driven along the frontmost perimeters of the air frame members serving to maximize the forward thrust provided the aircraft.

BRIEF DESCRIPTION OF THE DRAWING

These and other objects, advantages and features of the invention will become more readily apparent from the following detailed description when read in conjunction with the accompanying drawing figures, in which:

FIG. 1 is an elevational view of one of the air-frame members showing the plurality of airfoils movably mounted therearound;

FIG. 2 is an elevational view of an individual airfoil shown in its retracted state;

FIG. 3 is an elevational view of an airfoil as shown in its elevationally extended state;

FIG. 4 is a fragmentary plan view of an individual airfoil showing various of the details thereof;

FIG. 5 is a fragmentary plan view of a pair of adjacent airfoils showing the incorporation of their elongated pins in one of the drive chains;

FIG. 7 is an elevational view of the inside surface of one of the air-frame members showing the location of the cargo compartment relative thereto and continuous recess for translatably housing the extremities of the elongated pins of the airfoils, and showing also the stationary channel track disposed along the lowermost and rearmost perimeters thereof;

FIG. 8 is a fragmentary elevational view of one of the air-frame members showing the uppermost and frontmost sections of the movable channel track with a curvilinear track connector disposed therebetween, and showing also one of the airfoils in the process of being movably driven around the uppermost and frontmost perimeters of the air frame member;

FIG. 10 is a front view of one of the air frame members with a corresponding side of the cargo compartment attached thereto, such view showing also the continuous curvilinear recess therein and means for extendably and retractably moving the uppermost and frontmost movable sections of the channel track.

DESCRIPTION OF THE PREFERRED EMBODIMENT

Figure 6:
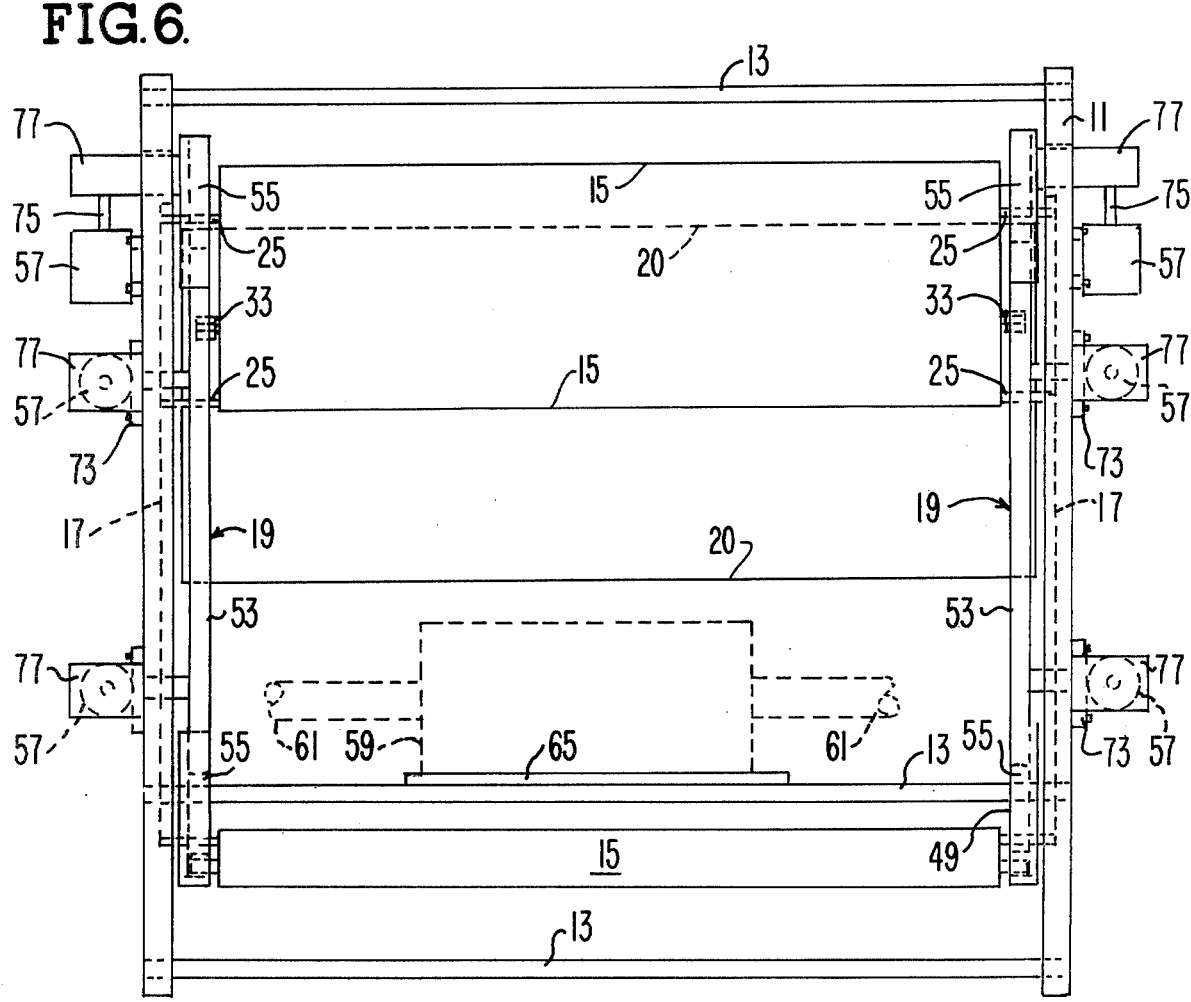
FIG. 6 is a front elevational view of the aircraft showing one of the airfoils in its path of travel downwardly around the frontmost perimeters of the air-frame members.

The invention resides in the provision in an aircraft of a plurality of spaced apart airfoils mounted for peripheral movement longitudinally around and between a pair of spaced apart and interconnected cargo-compartment-supporting air frame members, and the provision of means both for advancingly driving the airfoils around the perimeters of the air frame members, and for elevationally altering the plano-convex profiles of the airfoils as they are driven along the uppermost and frontmost of said perimeters, optimum elevational extension of said airfoils as they are driven along the frontmost perimeters of the air frame members serving to maximize the forward thrust of the aircraft, and optimum elevational extension of said airfoils as they are driven along the uppermost perimeters of the air frame members serving to maximize the lift provided thereby.

With reference to FIGS. 1 and 7, the variable lift aircraft is comprised of a pair of spaced apart air frame members 11 which are connected together by means of a plurality of elongated rods 13 disposed along the periphery thereof. Mounted for peripheral movement around and between the pair of air frame members 11 are a plurality of spaced apart airfoils 15, the detailed construction of which is hereinafter described. The path of travel of the airfoils 15 is in a clockwise direction as viewed in FIG. 1, as defined by a continuous curvilinear recess 17 formed in the inner surfaces of the air frame members 11, and defined also by a curvilinear channel track 19 fixed to the inner surfaces of the air frame members. In the preferred embodiment of the invention a total of 10 airfoils 15 would be utilized, each of the airfoils measuring four feet in chord length, 16 feet in width, with a six foot space between adjacent airfoils. The overall dimensions of the aircraft would preferably be 50 feet in length and 18 feet in width. The cargo compartment 20 is located interiorly of the rotating airfoils 15 and supported at its outermost side extremities by the air frame members 11 as by means of a plurality of interconnecting bolts or fasteners, such cargo compartments and fastening means being well known in the art and not considered to form a part of the present invention.

The individual airfoils 15 are each comprised of a pair of spaced apart first or front side plates 21 and a pair of spaced apart second or rear side plates 23, the pairs of side plates 21 and 23 being pivotally mounted at the outbound extremities thereof on first and second elongated pins 25 which extend outwardly a predetermined distance from either sides of the airfoils 15. The pair of elongated pins 25 are coplanarly supported within apertures formed in the extremities of elongated interior support braces 27 which are anchorably spaced apart within the airfoil and disposed adjacent the inner surfaces of the pairs of side plates 21 and 23. It can be seen from FIGS. 2, 3 and 4 that the inner extremities of the pair of front side plates 21 outwardly overlap the inner extremities of the pair of rear side plates 23. It can also be seen from FIG. 4 that the interior support braces 27 are separated from the inner surfaces of the side plates 21 and 23 by a first spacer 29 and a second spacer 31, the first spacer 29 being of greater width than the spacer 31 to compensate for the above referenced overlapping of the front side plates 21. Each of the airfoils 15 is also provided with a pair of roller bearings 33 extending outwardly from either side thereof, each being rotatably supported by a shoulder screw 35 that passes through a horizontal slot 37 formed in the overlapping extremity of the front side plate 21 and secured within a threaded aperture 38 formed in the overlapped extremity of the rear side plate 23, as best shown in FIG. 4. Each of the airfoils 15 is also provided with a first or front curvilinear webbed cover 39 and a second or rear curvilinear webbed cover 41, the front cover 39 being secured to the pair of spaced apart front side plates 21 and the rear cover 41 being secured to the spaced apart pair of rear side plates 23. With the pair of front side plates 21 and cover 39 pivotally mounted on the front elongated pin 25 and the pair of rear side plates 23 and rear cover 41 pivotally mounted on the rear elongated pin 25, it can be seen that an upward force applied to the roller bearings 33 will result in a predetermined elevational expansion in the profile of the airfoil 15, and that a downward force applied to the roller bearings 33 will result in a predetermined retraction in the profile of the airfoil, as illustrated in FIG. 2. When the airfoil 15 is disposed in its retracted state, the interior overlapping extremities of the side plates 21 and 23 will assume a parallel relationship as illustrated in FIG. 2, and when in its elevationally extended state, the interior extremities of the side plates 21 and 23 will assume an angular relationship as illustrated in FIG. 3.

As shown in FIG. 5, the elongated pins 25 extending outwardly from either side of each of the airfoils 15 are incorporated in predetermined locations in a pair of drive chains 43 disposed in contiguous relationship with the inner surfaces of the air-frame members 11, and in particular, in contiguous relationship with the continuous curvilinear recesses 17 thereof. The drive chains 43, in addition to the elongated pins 25, are comprised of a plurality of short pins 45 and links 47. It will be apparent from FIG. 5, that the predetermined space between adjacent airfoils 15 is defined by the placement of the elongated pins 25 in the drive chains 43.

Mounting of the plurality of airfoils 15 for peripheral movement around and between the pair of air-frame members 11 is provided by the translatable housing of the extremities of the elongated pins 25 in the recesses 17 formed in the inner surfaces of the air-frame members 11, and the translatable housing of the roller bearings 33 in the curvilinear channel tracks 19 fixed to the inner surfaces of the air-frame members.

As best illustrated in FIGS. 1, 7, 8 and 10, the curvilinear channel tracks fixed to the inner surfaces of the air-frame members 11, which have been generally designated at 19 above, are comprised of stationary sections 49 disposed along the lowermost and rearmost perimeters of the air-frame members (FIGS. 1, 6 and 7), and first and second movable sections 51 and 53 disposed along the uppermost and frontmost perimeters respectively of the air-frame members (as best illustrated in FIG. 8). Track connectors 55 are utilized for coupling the first movable sections 51 with the second movable sections 53, and for coupling the movable sections 51 and 53 with the stationary sections 49 (as best illustrated in FIG. 1).

Figure 9:
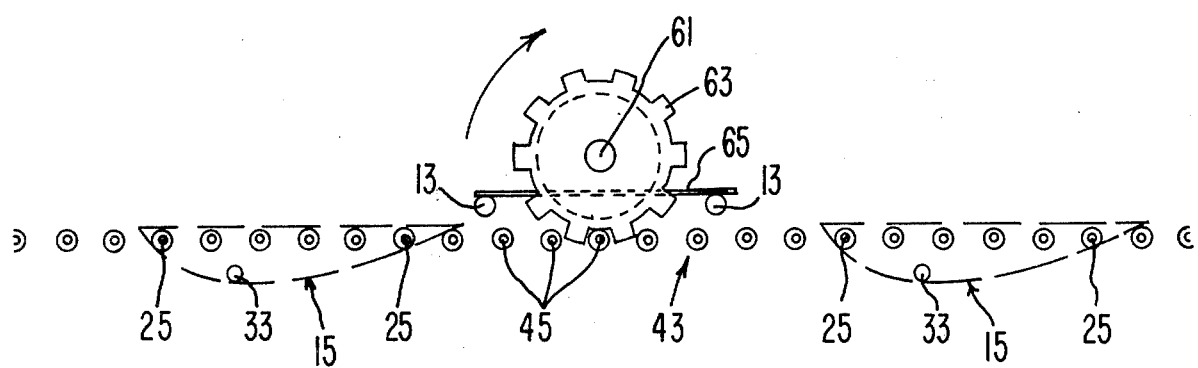
FIG. 9 is a fragmentary elevational view of the drive gear of the motor means in cooperable relationship with one of the drive chains.

Motive power for peripherally moving the plurality of airfoils 15 around and between the pair of air-frame members 11, and for activating hereinafter described hydraulic cylinders 57, is provided by a motor 59 having motor shafts 61 extending outwardly from either side thereof, each of the motor shafts being connected at the extremities thereof to a drive gear 63, as best illustrated in FIG. 5. The motor 59 is anchorably supported by means of a base plate 65, which in turn is supported by means of a pair of coplanarly disposed elongated rods 13, as best illustrated in FIGS. 6 and 9. The motor 59 would preferably be of the variable stroke type as described and claimed in U.S. Pat. No. 4,023,542. Operation of the motor 59, as by means of conventional control apparatus not forming a part of the present invention, would result in the rotational movement of the pair of drive chains 43, the pair of drive gears 63 being operationally engaged with the pins 45 and 25 thereof. Rotation of the drive chains 43 serves to drivably move the airfoils 15 in a clockwise direction (as viewed in FIG. 1), with the extremities of the elongated pins 25 housed within the recesses 17 formed in the air-frame members 11, and with the roller bearings 33 of the airfoils housed within the various sections of the channel tracks 19. Movement of the individual airfoils 15 along the frontmost perimeters of the air-frame members 11 serves to provide the aircraft with forward thrust, and movement of the airfoils along the uppermost perimeters of the air-frame members serves to accentuate the lift of the aircraft by reason of the well known principle of aerodynamics, the velocity of the air passing over the upper surfaces of the airfoils being increased and the pressure thereof decreased.

As previously mentioned, the channel tracks generally designated at 19 are comprised of first movable sections 51 disposed along the uppermost perimeters of the air-frame members 11, and second movable sections 53 disposed along the frontmost perimeters of the air-frame members. These movable sections are extendable outwardly and retractable inwardly (with respect to the air-frame members) a predetermined distance by hydraulic means activatable by the motor 59 as influenced by conventional control means not forming a part of the present invention. As shown in FIG. 1, a pump 67 is coupled to the motor 59 by means of the line 69, and coupled to a plurality of hydraulic cylinders 57 by means of a line 71. Two spaced apart and vertically oriented hydraulic cylinders 57 are provided for upwardly extending and downwardly retracting each of the first movable sections 51, and two spaced apart and horizontally oriented hydraulic cylinders 57 are provided for outwardly extending and inwardly retracting each of the second movable sections 53. Coupling of the hydraulic cylinders 57 to the movable track sections 51 and 53 is best described with reference to FIG. 10. Each of the hydraulic cylinders 57 is fixed to the outer surface of its associated air frame member by means of fasteners 73, and each cylinder is provided with a piston rod 75 to the outermost extremity of which is fixed a slide mount 77. The slide mounts 77 are each provided with a reduced projection 79 that extends through an associated rectangular aperture 81 formed in the corresponding air frame member 11, such rectangular aperture 81 permitting the outward extension and inward retraction of the corresponding slide mount 77 and piston shaft 75, the reduced projections 79 of the slide mounts 77 being best illustrated in FIG. 10. As also best illustrated in FIG. 10, each of the slide mounts 77 of the hydraulic cylinders 57 is fixed to the inner surface of its corresponding movable section 51 or 53 of the channel track 19 by means of an elongated fastener 83 the threaded extremity of which is secured within a threaded aperture formed in the inner surface of the movable section 51 or 53.

It can thus be seen that by extendably activating the vertically oriented pairs of hydraulic cylinders 57 disposed along the upper perimeters of the air frame members 11, the first movable sections 51 of the channel tracks 19 will be extended upwardly a predetermined distance to apply an upward force to the roller bearings 33 of the airfoils 15 passing therealong, such upward force serving to elevationally extend the profiles of such airfoils in the manner illustrated in FIG. 3. In like manner by extendably activating the pairs of horizontally oriented hydraulic cylinders 57 disposed along the frontmost perimeters of the air-frame members 11, the second movable sections 53 of the channel tracks 19 will be extended forwardly a predetermined distance to apply an outward force to the roller bearings 33 of the airfoils 15 passing therealong, such outward force serving the elevationally extend the profiles of such airfoils as also illustrated in FIG. 3. It is to be noted that the location of the stationary sections 49 of the channel tracks 19 disposed along the lowermost and rearmost perimeters of the air-frame members 11 relative to the curvilinear recesses 19 is such as to provide a retracting force to the roller bearings 33 of the airfoils passing therealong, such airfoils accordingly being held to the lower profile illustrated in FIG. 2.

It can be seen from the above description that the airfoils 15 passing along the uppermost and frontmost perimeters of the air-frame members 11 may controllably be provided either with the elevationally extended profile illustrated in FIG. 3 or the retracted profile illustrated in FIG. 2, and that the airfoils 14 passing along the lowermost and rearmost perimeters of the air-frame members will invariably be provided with the retracted profile shown in FIG. 2. The variable lift and variable thrust aspects of the inventive aircraft are accordingly provided by changing the profiles of the airfoils 15 as they are driven along the uppermost and frontmost perimeters, respectively, of the air-frame members 11, the elevational extension of said profiles from the retracted state shown in FIG. 2 serving to increase the lift or forward thrust of the aircraft depending upon the location of the airfoils at the time of their elevational extension, increased lift resulting when upon the occurrence of such elevational extension the airfoils are being drivenly passed along the uppermost perimeters of the air-frame members 11, and increased thrust resulting when such elevational extension occurs when the airfoils are being driven along the frontmost perimeters of the air-frame members 11. This phenomena of increased lift and thrust derives from the basic physics law governing fluids and gases, and, in particular, from the fact that an increase in the velocity of a gas passing over an object is accompanied by a decrease in the pressure of the gas applied thereto. It accordingly follows that given an airfoil maintained at a constant speed, the air passing over it would increase in velocity according to its distance of travel thereover, the increase in velocity of the air being accompanied by a corresponding decrease in the pressure of the air applied thereagainst and an increase in the lift provided by the airfoil.

OPERATION

From the above description it will be understood that a pilot in flying the inventive variable lift and variable thrust aircraft would outwardly extend the movable sections 51 and 53 of the channel tracks 19 when taking off on the shorter runway of city-based airports, to thereby elevationally extend the profiles of the airfoils 15 passing along the uppermost and frontmost perimeters of the air-frame members 11, and to maximize the lift and forward thrust provided by such airfoils. Upon being airborne at the desired altitude, the pilot could inwardly retract the movable sections 51 and 53 of the channel tracks 19, to thereby retractably lower the profiles of the airfoils passing along the uppermost and frontmost perimeters of the air-frame members, as the aircraft attains the desired cruising speed.

Although the inventive variable lift advancing wing aircraft has been described in considerable detail, it will be appreciated that various changes therein may be made by those skilled in the art without departing from the true spirit and scope of the invention.

What is claimed is:

1. A variable lift advancing wing aircraft comprising:
   (a) a pair of spaced apart air-frame members defining the overall dimensions of said aircraft, said air-frame members being secured together by a plurality of elongated rods to provide exterior support for a cargo compartment,
   (b) a plurality of spaced apart movable airfoils mounted for peripheral movement around and between said pair of air-frame members externally of said cargo compartment, each of said airfoils being vertically expansible to provide a variable plano-convex profile,
   (c) means for drivably moving said plurality of airfoils in a predetermined peripheral direction around and between said pair of air-frame members, the movement of each airfoil along the frontmost perimeters of said air-frame members providing forward thrust to said aircraft, and
   (d) means for expansibly and retractably changing the plano-convex profiles of said airfoils as said airfoils are moved along the uppermost and frontmost perimeters of said air-frame members, whereby the lift and forward thrust provided respectively by said airfoils is varied according to the elevation of their plano-convex profiles.

2. The aircraft defined in claim 1 wherein each of said airfoils is comprised of:
   (a) first and second pairs of spaced-apart side plates pivotally mounted on first and second elongated pins, said elongated pins being coplanarly supported within apertures formed in the extremities of a pair of elongated interior support braces, adjacent ends of said first and second side plates presenting the overlapping configuration,
   (b) a pair of roller bearings exteriorly disposed of said side plates and supported by means of shoulder screws passing through horizontal slots formed in the overlapping ends of said first side plates and secured within apertures formed in the overlapped ends of said second side plates, and
   (c) a first and second curvilinear webbed cover secured to said first and second pairs of side plates and ending at the overlapping ends thereof, whereby upon activation of said pair of roller bearings in a direction normal to the plane of said support braces the plano-convex profile of said airfoil may be elevationally altered.

3. The aircraft defined in claim 2 wherein said mounting of said airfoils for peripheral movement around and between said pair of air-frame members is effectuated by means of an endless curvilinear recess formed in the inner surface of each of said pair of air-frame members, and an endless curvilinear channel track secured to the inner surface of each of said pair of air-frame members outwardly adjacent said curvilinear recess, said recesses serving to translatably house the outermost extremities of said first and second elongated pins of said airfoils, and said channel tracks serving to translatably house said pairs of roller bearings of said airfoils.

4. The aircraft defined in claim 3 wherein said means for drivably moving said airfoils around and between said pair of air-frame members comprises:
   (a) a motor mounted by means of a base plate fixed to a selected pair of said elongated rods securing said air-frame members together,
   (b) a drive shaft extending outwardly from both ends of said motor into contiguous relationship with said pair of air-frame members,
   (c) a pair of drive gears fixed to the outer extremities of said drive shaft, and
   (d) a pair of endless chains disposed in juxtaposition with said recesses formed in said air-frame members, each of said chains formed of a plurality of links and interconnecting pins including the extremities of said elongated pins of said airfoils, said pins of said chains being operably engaged by a corresponding one of said drive gears when said motor is activated to thereby drivably move said airfoils around and between said pair of air-frame members, the space between said airfoils being predetermined by the incorporation of said elongated pin extremities in said pair of chains.

5. The aircraft defined in claim 3 wherein said means for expansibly and retractably changing the plano-convex profiles of said airfoils is comprised of:
   (a) a stationary section of each of said channel tracks secured to said inner surfaces of said air-frame members, said stationary sections being disposed along the lowermost and rearmost perimeters thereof, (b) a first movable section of each of said channel tracks of said air-frame members, said first movable sections being disposed along the uppermost perimeters thereof, (c) a second movable section of each of said channel tracks, said second movable sections being disposed along the frontmost perimeters thereof, (d) a plurality of curvilinear track connectors coupling said first and said second movable sections to said stationary sections, and coupling also said first movable sections to said second movable sections, and (e) means for extending and retracting said first and said second movable sections of said channel tracks as the roller bearings of said airfoils are translatably engaged therewith.

6. The aircraft defined in claim 5 wherein said means for extending and retracting said first and second movable sections of said channel tracks is comprised of:

(a) a plurality of hydraulic cylinders mounted to the exterior surfaces of said pair of air-frame members, said cylinders being operably connected to a pump associated with said motor, each of said cylinders being provided with an outwardly and coaxially extending shaft, and (b) a slide-mount fixed to the outermost extremity of each of said shafts of said hydraulic cylinders, each of said slide-mounts passing through a corresponding rectangular aperture formed in the air-frame member to which said cylinder is mounted, and being fixed to its corresponding movable section of said channel track.

7. The aircraft defined in claim 6 wherein said first movable sections and said second movable sections of said channel tracks are each provided with at least a spaced apart pair of said hydraulic cylinders and with at least a corresponding pair of slide-mounts.

8. In an aircraft having a cargo compartment supported by a pair of spaced-apart interconnected air-frame members, the improvement comprising:

(a) a plurality of spaced apart movable airfoils mounted for peripheral movement around and between said pair of air-frame members externally of said cargo compartment, each of said airfoils being vertically expansible to provide a variable plano-convex profile, (b) means for drivably moving said plurality of airfoils in a predetermined direction around and between said pair of air-frame members, the movement of each airfoil along the frontmost perimeters of said air-frame members providing forward thrust to said aircraft, and (c) means for expansibly and retractably changing the plano-convex profiles of said airfoils as said airfoils are moved along the uppermost and frontmost perimeters of said air-frame members, whereby the lift and forward thrust provided respectively by said airfoils is varied according to the elevation of their plano-convex profiles.

9. The aircraft defined in claim 8 wherein each of said airfoils is comprised of:

(a) first and second pairs of spaced apart side plates pivotally mounted on first and second elongated pins, said elongated pins being coplanarly supported within apertures formed in the extremities of a pair of elongated interior support braces, adjacent ends of said first and second side plates presenting an overlapping configuration, (b) a pair of roller bearings exteriorly disposed of said side plates and supported by means of shoulder screws passing through horizontal slots formed in the overlapping ends of said first side plates and secured within apertures formed in the overlapped ends of said second side plates, and (c) a first and second curvilinear webbed cover secured to said first and second pairs of side plates and ending at the overlapping ends thereof, whereby upon activation of said pair of roller bearings in a direction normal to the plane of said support braces the plano-convex profile of said airfoil may be elevationally altered.

10. The aircraft defined in claim 9 wherein said mounting of said airfoils for peripheral movement around and between said pair of air-frame members is effectuated by means of an endless curvilinear recess formed in the inner surface of each of said pair of air-frame members, and an endless curvilinear channel track secured to the inner surface of each of said pair of air-frame members outwardly adjacent said curvilinear recess, said recesses serving to translatably house the outermost extremities of said first and second elongated pins of said airfoils, and said channel tracks serving to translatably house said pair of roller bearings of said airfoils.

11. The aircraft defined in claim 10 wherein said means for drivably moving said airfoils around and between said pair of air-frame members comprises:

(a) a motor mounted by means of a base plate secured between said pair of air-frame members, (b) a drive shaft extending outwardly from both ends of said motor into contiguous relationship with said pair of air-frame members, (c) a pair of drive gears fixed to the outer extremities of said drive shaft, and (d) a pair of endless chains disposed in juxtaposition with said recesses formed in said air-frame members, each of said chains being formed of a plurality of links and interconnecting pins including the extremities of said elongated pins of said airfoils, said pins of said chains being operably engaged by a corresponding one of said drive gears when said motor is activated to thereby drivably move said airfoils around and between said pair of air-frame members, the space between said airfoils being predetermined by the incorporation of said elongated pin extremities in said pair of chains.

12. The aircraft defined in claim 10 wherein said means for expansibly and retractably changing the plano-convex profiles of said airfoils is comprised of:

(a) a stationary section of each of said channel tracks secured to said inner surfaces of said air-frame members, said stationary sections being disposed along the lowermost and rearmost perimeters thereof, (b) a first movable section of each of said channel tracks of said air-frame members, said first movable sections being disposed along the uppermost perimeters thereof, (c) a second movable section of each of said channel tracks, said second movable sections being disposed along the frontmost perimeters thereof, (d) a plurality of curvilinear track connectors coupling said first and said second movable sections to said stationary sections, and coupling also said first movable sections to said second movable sections, and (e) means for extending and retracting said first and second movable sections of said channel tracks as the roller bearings of said airfoils are translatably engaged therewith.

13. The aircraft defined in claim 12 wherein said means for extending and retracting said first and second movable sections of said channel tracks is comprised of:
(a) a plurality of hydraulic cylinders mounted to the exterior surfaces of said pair of air-frame members, said cyclinders being operably connected to a pump associated with said motor, each of said cylinders being provided with an outwardly and coaxially extending shaft, and
(b) a slide-mount fixed to the outermost extremity of each of said shafts of said hydraulic cylinders, each of said slide-mounts passing through a corresponding rectangular aperture formed in the air-frame member to which said cylinder is mounted, and being fixed to its corresponding movable section of said channel track.

14. The aircraft defined in claim 13 wherein said first movable sections and said second movable sections of said channel tracks are each provided with a spaced-apart pair of said hydraulic cylinders and with a corresponding pair of slide-mounts.

15. An expansible airfoil for multiple use in a variable lift advancing wing aircraft, said aircraft being provided with a pair of spaced-apart interconnected air-frame members, a cargo compartment supported by said air-frame members, means for drivably moving a plurality of said expansible airfoils around and between said air-frame members to thereby provide said aircraft with both lift and forward thrust, and means for expansibly and retractably activating a plurality of said airfoils such as to change the plano-convex profiles thereof and to thereby vary the lift and forward thrust of said aircraft according to the elevation of their plano-convex profiles, said expansible airfoil comprising:
(a) first and second pairs of spaced-apart side plates pivotally mounted on first and second elongated pins, said elongated pins being coplanarly supported within apertures formed in the extremities of a pair of elongated interior support braces, adjacent ends of said first and second side plates presenting an overlapping configuration.
(b) a pair of roller bearings exteriorly disposed of said side plates and supported by means of shoulder screws passing through horizontal slots formed in the overlapping ends of said first said plates and secured within apertures formed in the overlapped ends of said second side plates, and
(c) a first and second curvilinear webbed cover secured to said first and second pairs of side plates and ending at the overlapping ends thereof, whereby upon activation of said roller bearings in a direction normal to the plane of said support braces the plano-convex profile of said airfoil may be elevationally altered.

16. In an aircraft having a pair of spaced-apart interconnected air-frame members supporting a cargo compartment, and a plurality of spaced-apart vertically expansible airfoils mounted for peripheral movement around and between said pair of air-frame members, the improvement comprising:
(a) means for drivably moving said plurality of airfoils in a predetermined peripheral direction around and between said pair of air-frame members, the movement of each airfoil along the frontmost perimeters of said air-frame members providing forward thrust to said aircraft, and
(b) means for expansibly and retractably changing the plano-convex profiles of said expansible airfoils as said airfoils are moved along the uppermost and frontmost perimeters of said air-frame members, whereby the lift and forward thrust provided respectively by said airfoils is varied according to the elevation of their plano-convex profiles.

17. The improvement defined in claim 16 wherein said means for drivably moving said plurality of airfoils around and between said pair of air-frame members comprises:
(a) an endless curvilinear recess formed in the inner surface of each of said pair of air-frame members and an endless curvilinear channel track secured to the inner surface of each of said air-frame members outwardly adjacent said curvilinear recess, said recesses serving to translatably house the outermost extremities of a pair of elongated pins extending outwardly from each of said vertically expansible airfoils, and said channel tracks serving to translatably house a pair of oppositely disposed roller bearings fixed to and extending outwardly of each of said airfoils,
(b) a motor mounted by means of a base plate secured to said pair of air-frame members,
(c) a drive shaft extending outwardly from both ends of said motor into contiguous relationship with said pair of air-frame members,
(d) a pair of drive gears fixed to the outer extremities of said drive shaft, and
(e) a pair of endless chains disposed in juxtaposition with said recesses formed in said air-frame members, each of said chains being formed of a plurality of links and interconnecting pins including the extremities of said elongated pins of said airfoils, said pins of said chains being operably engaged by a corresponding one of said drive gears when said motor is activated to thereby drivably move said airfoils around and between said pair of air-frame members, the space between said airfoils being predetermined by the incorporation of said elongated pin extremities in said pair of chains.

18. The improvement defined in claim 17 wherein said means for expansibly and retractably changing the plano-convex profiles of said expansible airfoils comprises:
(a) a stationary section of each of said channel tracks secured to said inner surfaces of said air-frame members, said stationary sections being disposed along the lowermost and rearmost perimeters thereof,
(b) a first movable section of each of said channel tracks of said air-frame members, said first movable sections being disposed along the uppermost perimeters thereof,
(c) a second movable section of each of said channel tracks, said second movable sections being disposed along the frontmost perimeters thereof,
(d) a plurality of curvilinear track connectors coupling said first and said second movable sections to said stationary sections, and coupling also said first movable sections to said second movable sections,
(e) a plurality of hydraulic cylinders mounted to the exterior surfaces of said pair of air-frame members, said cylinders being operably connected to a pump associated with said motor, each of said cylinders being provided with an outwardly and coaxially extending shaft, and (f) a slide-mount fixed to the outermost extremity of each of said shafts of said hydraulic cylinders, each of said slide-mounts passing through a corresponding rectangular aperture formed in the air-frame member to which said cylinder is mounted, and being fixed to its corresponding movable section of said channel track.

19. The improvement defined in claim 18 wherein said first movable sections and said second movable sections of said channel tracks are each provided with at least a spaced-apart pair of said hydraulic cylinders and with at least a corresponding pair of slide-mounts.

20. A rapid-lift airfoil-driven aircraft comprising an airframe supporting a cargo compartment, a plurality of spaced apart airfoils movably disposed peripherally along and around the top, front, bottom and rear sides of said airframe exteriorly of said cargo compartment, means for drivably moving said airfoils in a predetermined direction around said airframe, whereby to provide forward thrust to said aircraft as said airfoils are driven past the front side perimeter thereof, and means for expansibly and retractably altering the plano-convex profiles of said airfoils as said airfoils are driven past the top side and front side perimeters thereof, whereby to vary the lift and forward thrust of said aircraft respectively, optimum elevational expansion of said airfoils when driven past the top side perimeter thereof serving to maximum the lift of said aircraft, and optimum elevational expansion of said airfoils when driven past the front side perimeter thereof serving to maximize the forward thrust of said aircraft.

* * * * *